Figure 1:
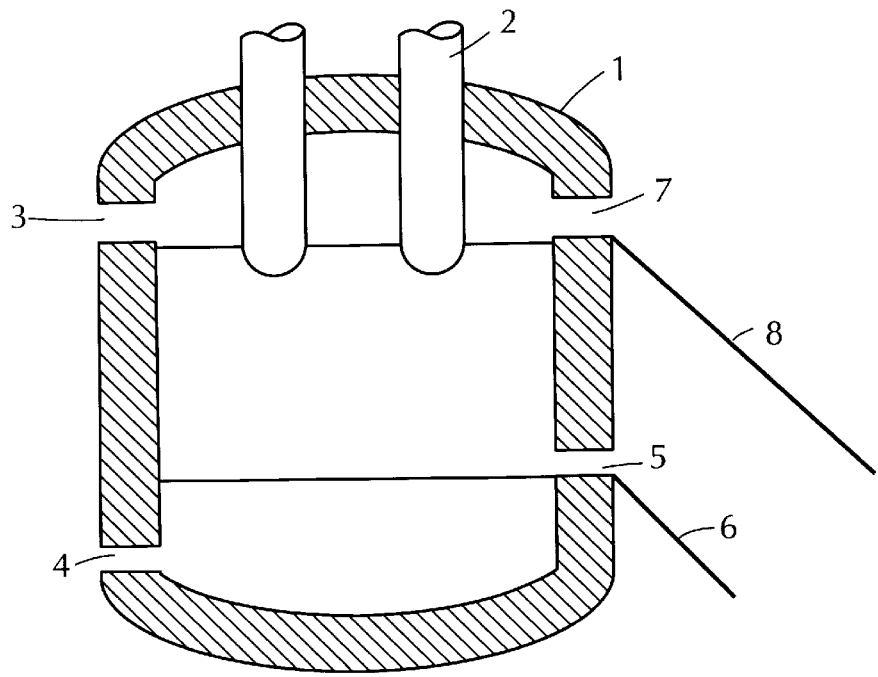

United States Patent
Mäntymäki

[11] Patent Number: 6,096,110
[45] Date of Patent: Aug. 1, 2000

[54] METHOD FOR CLEANING SLAG IN AN ELECTRIC FURNACE

[75] Inventor: Tarmo Mäntymäki, Harjavalta, Finland

[73] Assignee: Outokumpu OYJ, Finland

[21] Appl. No.: 09/047,692

[22] Filed: Mar. 25, 1998

[30] Foreign Application Priority Data

Apr. 14, 1997 [FI] Finland ..................... 971550

[51] Int. Cl.[7] .................................................. C22B 9/00
[52] U.S. Cl. ........................ 75/10.35; 75/585; 266/215
[58] Field of Search .................. 75/10.1, 10.35, 75/10.59, 585, 655, 640; 266/214, 215

[56] References Cited

U.S. PATENT DOCUMENTS

| | | | |
|---|---|---|---|
| 929,142 | 7/1909 | Ladd | 75/640 |
| 3,666,440 | 5/1972 | Kono et al. | 75/640 |
| 3,857,700 | 12/1974 | Ammann et al. | 75/640 |
| 4,110,107 | 8/1978 | Paulson et al. | 75/10.35 |
| 4,168,156 | 9/1979 | Shabalina et al. | 75/10.29 |
| 4,349,383 | 9/1982 | Chaudhuri | 75/640 |
| 5,215,571 | 6/1993 | Macuson et al. | 75/626 |
| 5,658,368 | 8/1997 | Diaz et al. | 75/585 |
| 5,853,657 | 12/1998 | Diaz et al. | 266/145 |

Primary Examiner—Prince Willis
Assistant Examiner—Tima McGuthry-Banks
Attorney, Agent, or Firm—Morgan & Finnegan, L.L.P.

[57] ABSTRACT

The invention relates to a method for cleaning slag, created in metallurgical processes of non-ferrous metals, in an electric furnace, and particularly the method is related to a semi-continuous cleaning process. According to the novel method, the electric furnace is provided with at least two slag tapping holes, the lower of which is arranged on the same level as the tap hole in a conventional, batchwise operated furnace, and the second tap hole is located higher up, either at the height of the feed inlet or only slightly underneath it.

7 Claims, 1 Drawing Sheet

METHOD FOR CLEANING SLAG IN AN ELECTRIC FURNACE

The present invention relates to a method for cleaning slags created in metallurgical processes of non-ferrous metals in an electric furnace, and in particularly the method relates to a semi-continuous cleaning method. In pyrometallurgical nickel and copper processes, the dried, finely divided nickel and/or copper sulfide concentrate is first conducted for instance to a flash smelting furnace, where in addition to the concentrate, there is fed air, oxygen or a mixture thereof, and flux such as sand. In the furnace the concentrate reacts with the other substances fed therein, and on the bottom of the furnace, there are settled two layers, the lower of which is a matte containing the major part of valuable metals, and the higher is a slag layer, which also contains a small amount of valuable metals.

The oxidized slag obtained from a flash smelting furnace or from some other furnace at the first process stage contains valuable metals to such an extent that its treatment is continued, most generally in an electric furnace, where the slag is reduced by means of a reductant, such as coke. In the electric furnace treatment, the valuable metals bound to the slag phase are reduced and separated to form a specific matte phase underneath the slag layer. The created matte and the discardable, reduced slag are both removed through respective tap holes. In addition to copper and nickel, valuable metals include precious metals and other non-ferrous metals, such as cobalt, present in small amounts in the slag.

In most cases the electric furnace used in treating the slag is run as a batch process. Now the furnace volume, i.e. the batch size, and the time needed for processing the batch at the various stages restricts the furnace capacity. Hence, if for example the concentrate smelting capacity is increased, it is also necessary to raise either the electric furnace is increased, it is also necessary to raise either the electric furnace capacity for instance by implementing two electric furnaces or by replacing one furnace with another, bigger furnace, or by cutting the reduction and settling time of the batch, i.e. by decreasing the recovery rate.

Various methods have been developed for increasing the capacity of batchwise operated electric furnaces. U.S. Pat. No. 3,857,700 discloses a method where slag cleaning is improved by means of mechanical mixing. U.S Pat. No. 4,110,107 describes a method where the carbon used in the reduction is injected to the molten slag, and a method according to U.S. Pat. No. 4,168,156 attempts to boost the slagging-off by feeding gas into the melt.

From U.S Pat. No. 3,666,440, there is known a slag cleaning method where a continuously operated electric furnace is used. In this type of a furnace, the tap hole of the treated waste slag is arranged on the same level as the inlet of the oxidized slag to be fed into the furnace. The advantage of the furnace is that the slag is tapped as an overflow from the furnace. Because the most completely reduced slag is located on the surface, it is advantageous that it is discharged first. In a batch process, the slag tapping hole is located in the bottom part of the slag layer, where the slag cleaning is carried out last. On the other hand, the drawback of a continuous process is that in the course of time, the major part of the furnace volume is left unused, when the entering slag flows out of the furnace via the fastest route. In the method according to the U.S. Pat. No. 3,666,440, this is attempted to be prevented by means of a wall structure located at the charging end and extending down as far as the slag layer.

According to the present invention, in order to increase the capacity of a batchwise operated furnace, there is now developed a slag cleaning method that can be called semi-continuous. The method aims at combining the advantages of batchwise and continuous methods, and at the same time at minimizing the drawbacks of both methods.

As is apparent from what was said above, in an electric furnace there is generally used only one slag tapping hole at a time; in a batch-operated furnace it is located at the bottom part of the slag layer, and in a continuously operated furnace it is provided at the height of the feed inlet, in which case the reduced slag is discharged as an overflow. Obviously there is always constructed at least one reserve tap hole in the furnace, but these holes are not taken into account in the present invention. According to the novel method, the electric furnace is provided with at least two slag tapping holes meant for active use; the lower is located on the level of the tap hole of a conventional, batch-operated furnace, and the other hole is located higher up, either on the level of the feed inlet or only slightly lower. The terms tap hole, tapping hole and (slag) discharge hole used in the text all refer to the same thing. The essential novel features of the invention are apparent from the appended claims.

By means of the method according to the invention, the quantity of the batch to be fed into the electric furnace increases by 20–50% as compared to a conventional batch process, but the total treatment time of the batch remains the same.

Figure 2:
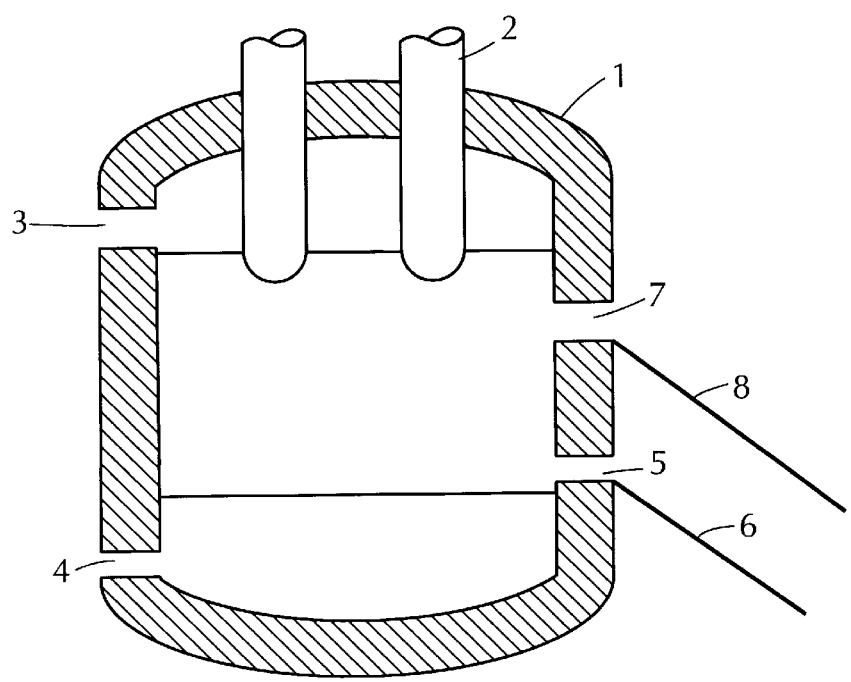

FIG. 1 and FIG. 2 are a cross-sectional drawing of an electric furnace adapted for the semi-continuous cleaning of slag created in the smelting or metallurgical processing of non-ferrous metals. In the drawings, an electric furnace is equipped with electrodes 2, a slag feed inlet 3, a matte tapping hole 4 and a lower slag tapping hole 5 with its launder 6. The furnace also has an upper tapping hole 7 with a launder 8.

In FIG. 1, the tapping hole 7 is on the level of the feed inlet 3. The matte tapping hole 4 also has a launder (not shown). In FIG. 2 the upper tapping hole 7 is below the maximum melt surface of the furnace, and is no more than one half, advantageously about one third, of the height between the maximum melt surface and the normal slag tapping hole 5.

The so-called semi-continuous electric furnace according to the invention can be run in two alternative ways. When the higher slag tapping hole is made in the upper part of the furnace, on the same level there are also provided the launders, and if lower holes and launders are already provided in the furnace, they are also maintained. If the furnace is a new electric furnace, there are provided tap holes and launders for both batchwise and continuous removal.

The first operating method of the so-called semi-continuous process is as follows: slag cleaning in the electric furnace begins so that in a known fashion, the furnace that was completely emptied of slag through the lower tap hole is started to be filled by charging slag into the electric furnace in a normal fashion from a flash smelting furnace or some other corresponding smelting furnace, while the lower tap hole is closed. Onto the slag surface, there is fed some reductant, such as coke. The furnace is filled up to the maximum melt level, i.e. as far as the upper tap hole provided on the level of the feed inlet, but thereafter feeding is still continued uninterrupted for example for a duration that corresponds to 20–50% of the normal filling time of the furnace. Now the overflow starts through the upper hole of the furnace. It is naturally clear that at least the upper slag tapping hole is made on the opposite side of the furnace with respect to the feed inlet. The slag that flows over through the upper tap hole is slag that has been in contact with a reductant ever since the beginning of the pouring, so that it has ample time to be reduced and settled, and it has a low valuable metal content. The overflow must be stopped when the slag fed into the furnace begins too directly to flow out as an overflow. The charging from the smelting furnace to the electric furnace is stopped, and thereafter the electric furnace is processed in the fashion of a batchwise operated furnace, by reduction, settling and sulfuring in a normal way. The final tapping of the cleaned slag takes place through the lower tap hole, in the same way as in a normal batch process.

According to another so-called semi-continuous method of operation, the upper slag tapping hole completed with the launder is constructed below the maximum melt surface of the furnace, for instance at a distance that is no more than ½, advantageously about ⅓ of the height between the maximum melt surface and the normal slag tapping hole. In the beginning, the furnace is operated in the same fashion as above, i.e. the filling of a completely emptied furnace is started by charging slag in a normal way from a flash smelting furnace or a corresponding smelting furnace to the electric furnace, while the lower tap hole is closed. Onto the slag surface, there is fed some reductant, such as coke. The furnace is filled up to the upper tap hole, but thereafter the charging is continued uninterrupted for example for a period that equals to about 20–50% of the normal furnace filling time. Now overflow starts through the upper hole in the furnace. After a suitable period of overflowing, the upper hole is closed and the slag surface is raised up to maximum. The discharging of the furnace is started after a processing time that is shorter than normal, first through the upper tap hole, because it can be assumed that the surface layer of the slag consists of already processed, reduced slag. After a suitable time, i.e. a time consumed in a normal batch process, the slag tapping is finished through the lower hole.

As is seen in the description of the operation methods above, it is now possible to run an electric furnace meant for a batch process as semi-continuous, and thus the furnace capacity can be remarkably increased. The method according to the invention is particularly useful when production should be increased, because in advantageous conditions, the embodiments described above are capable of processing even a double amount of slag as compared to the conventional batch process. Respectively, by employing said method, the new furnace unit can be designed to be smaller in measures than the prior art furnaces.

What is claimed is:

1. In a method for cleaning slag created in a metallurgical process of a non-ferrous metal, in which the slag, fed into an electric furnace, forms by means of a reductant, a reduced slag layer and a matte layer beneath the slag layer, said electric furnace being equipped with a slag feed inlet at maximum melt level, a slag tapping hole at the bottom part of the slag layer for the reduced slag and a matte tapping hole, the improvement which comprises feeding slag into an electric furnace equipped with two slag tapping holes at different heights, filling the furnace to its maximum melt level while the lower slag tapping hole at the bottom part of the slag layer is closed, permitting flow of reduced slag out and through an upper slag tapping hole, stopping said flow of the reduced slag from the upper slag tapping hole, stopping the feed of slag into the furnace, and tapping said slag through said lower tapping hole.

2. A method as defined in claim 1, wherein the upper slag tapping hole is arranged at the height of the feed inlet.

3. A method as defined in claim 2, wherein the filling of the electric furnace with the slag is continued, even after the electric furnace is filled up to a level of the maximum melt level, for a period that corresponds to 20–50% of the normal filling period of the furnace, whereafter the filling is stopped.

4. A method as defined in claim 1, wherein the upper slag tapping hole is no more than one-half of the distance from the feed inlet to the lower slag tapping hole measured from the maximum melt level.

5. A method as defined in claim 1, wherein the upper slag tapping hole is no more than one-third of the distance from the feed inlet to the lower slag tapping hole, measured from the maximum melt level.

6. A method as defined in claims 4 or 5, wherein the filling of the electric furnace with the slag is continued, even after the electric furnace is filled up to a level of the upper tapping hole, for a period that corresponds to 20–50% of the normal filling period of the furnace, whereafter the filling is stopped, the upper tap hole is closed, the slag surface is raised up to the level of the maximum melt level.

7. A method as defined in claim 1, wherein the reduced slag is discharged from the furnace first through the upper tapping hole and thereafter through the lower tapping hole.

* * * * *